United States Patent
Alloin et al.

(10) Patent No.: US 12,092,067 B2
(45) Date of Patent: Sep. 17, 2024

(54) METHOD FOR COUPLING A HYDROELECTRIC POWER PLANT TO THE GRID COMPRISING AT LEAST TWO HYDROELECTRIC UNITS

(71) Applicant: GE Renewable Technologies, Grenoble (FR)

(72) Inventors: Quentin Alloin, Grenoble (FR); Renaud Guillaume, Saint Martin d'Heres (FR)

(*) Notice: Subject to any disclaimer, the term of this patent is extended or adjusted under 35 U.S.C. 154(b) by 172 days.

(21) Appl. No.: 17/783,347

(22) PCT Filed: Dec. 11, 2020

(86) PCT No.: PCT/EP2020/085786
§ 371 (c)(1),
(2) Date: Jun. 8, 2022

(87) PCT Pub. No.: WO2021/116422
PCT Pub. Date: Jun. 17, 2021

(65) Prior Publication Data
US 2023/0010493 A1  Jan. 12, 2023

(30) Foreign Application Priority Data
Dec. 12, 2019 (EP) .................. 19306638

(51) Int. Cl.
*F03B 15/00* (2006.01)
*F01D 13/00* (2006.01)
*F02K 1/15* (2006.01)
*H02J 3/38* (2006.01)

(52) U.S. Cl.
CPC .......... *F03B 15/005* (2013.01); *F01D 13/00* (2013.01); *F01D 13/003* (2013.01); *F02K 1/15* (2013.01);
(Continued)

(58) Field of Classification Search
CPC ...... F03B 15/005; F01D 13/00; F01D 13/003; F02K 1/15; H02J 3/381; F05B 2240/40; F05B 2270/101; F05B 2270/33
See application file for complete search history.

(56) References Cited

U.S. PATENT DOCUMENTS 11,239,778 B2    2/2022   Guillaume et al.
11,248,578 B2 *  2/2022   Alloin .................. F03B 15/00
(Continued)

FOREIGN PATENT DOCUMENTS

EP    3361088 A1     8/2018
EP    3379073 A1 *  9/2018  ............. F03B 15/08
(Continued)

OTHER PUBLICATIONS

European Search Report Corresponding to EP19306638.8 on Jun. 23, 2020.
(Continued)

Primary Examiner — Matthew T Largi
(74) Attorney, Agent, or Firm — Dority & Manning, P.A.

(57) ABSTRACT

The invention concerns a method for coupling a hydroelectric power plant in a turbine mode to a grid, in order to generate power for a grid, said hydroelectric power plant comprising at least a first hydroelectric unit (10) and a second hydroelectric unit (100), each provided with a runner (6) mechanically coupled to a shaft line (8) and to a generator, a distributor (4) comprising guide vanes to control a flow of water to said runner, said hydroelectric power plant further comprising a variable frequency drive (20), the method comprising:
 a) starting the rotation of at least said first hydroelectric unit (10) and said second hydroelectric unit (100);
 b) connecting the variable frequency drive (20) to the generator of the first hydroelectric unit (10) and to the grid and stabilizing the speed of the first hydroelectric unit (Continued)

c) connecting the first hydroelectric unit (10) to the grid and disconnecting the generator of the first hydroelectric unit from the variable frequency drive (20);

d) connecting said variable frequency drive (20) to the generator of the second hydroelectric unit (100) and to the grid and stabilizing the speed of the second hydroelectric unit;

e) connecting the second hydroelectric unit (100) to the grid and disconnecting the generator of the second hydroelectric unit from said variable frequency drive (20).

14 Claims, 6 Drawing Sheets

(52) U.S. Cl.
CPC ........... *H02J 3/381* (2013.01); *F05B 2240/40* (2013.01); *F05B 2270/101* (2013.01); *F05B 2270/337* (2013.01); *Y10T 74/19014* (2015.01)

(56) References Cited

U.S. PATENT DOCUMENTS

| | | | |
|---|---|---|---|
| 11,873,789 B2 * | 1/2024 | Ruiz | F03B 3/10 |
| 2017/0254313 A1 * | 9/2017 | Alloin | F03B 15/06 |
| 2017/0268478 A1 * | 9/2017 | Alloin | F03B 15/005 |
| 2020/0040866 A1 | 2/2020 | Alloin et al. | |

FOREIGN PATENT DOCUMENTS

| | | | | |
|---|---|---|---|---|
| WO | WO2012175952 A1 | 12/2012 | | |
| WO | WO-2018146273 A1 * | 8/2018 | | F03B 11/04 |

OTHER PUBLICATIONS

PCT International Search Report Corresponding to PCT/EP2020/085786 on Feb. 18, 2021.

* cited by examiner

METHOD FOR COUPLING A HYDROELECTRIC POWER PLANT TO THE GRID COMPRISING AT LEAST TWO HYDROELECTRIC UNITS

TECHNICAL FIELD

The invention relates to a method for coupling a hydroelectric power plant to a grid (including starting in turbine mode and/or transitioning from pump to turbine mode), in particular a hydroelectric power plant of the type which comprises at least 2 hydroelectric units, each one comprising a rotor that can be driven in rotation by water. The present invention is further intended to propose a method for coupling such a hydroelectric power plant to the grid in a faster way than prior art methods.

PRIOR ART

In order to insure a grid stability and/or to prevent a network blackout, a grid balancing between the electrical power production and the electrical power consumption must be achieved.

Hydroelectric power plants have an electrical power reserve, via water reserves contained in a reservoir, that can be provided upon demand by starting a hydroelectric turbine in order to compensate any variation of the consumption and/or the production of the electrical power.

To this regard, the time response for providing such an electrical power reserve is thus a critical factor, on the basis of which the electricity producer can expect a more or less advantageous remuneration.

Prior art methods are known, for example from EP 3361088, to start a turbine with help of a first control loop and second control loop, one of said loops comprising a variable frequency drive connected to the grid.

However, a variable frequency drive is a costly device.

Furthermore the prior art does not provide any solution to start a hydroelectric power plant comprising at least 2 generators. It is therefore an object of the invention to propose a method for coupling a hydroelectric power plant to the grid, in particular a hydroelectric power plant of the type which comprises at least 2 hydroelectric units, in a faster way than known prior art method.

It is also an object of the invention to propose a method for coupling the hydroelectric power plant to the grid, in particular a hydroelectric power plant of the type which comprises at least 2 hydroelectric units, that does not require any additional investments.

SUMMARY OF THE INVENTION

The aforementioned objects are, at least partly, achieved by a method for coupling a hydroelectric power plant in a turbine mode to a grid, in order to produce power to be injected into said grid, said hydroelectric power plant comprising at least a first hydroelectric unit and a second hydroelectric unit, each provided with a runner mechanically coupled to a shaft line and to a generator, a distributor comprising guide vanes to control a flow of water to said runner, said hydroelectric power plant further comprising a variable frequency drive, the method successively comprising, after starting the rotation of both hydroelectric units:

connecting the generator of the first hydroelectric unit to the variable frequency drive and then to the grid, thus coupling the first hydroelectric unit in a turbine mode to the grid;

then connecting the generator of the second hydroelectric unit to the variable frequency drive and then to the grid.

If the hydroelectric power plant has more than 2 hydroelectric units, said method further comprises, after the above steps:

connecting the generator of a third hydroelectric unit to the variable frequency drive and then to the grid;

and then successively connecting the generator of any other hydroelectric unit to the variable frequency drive and then to the grid.

A more specific embodiment of the above method or of a method for coupling a hydroelectric power plant in a turbine mode to a grid, in order to generate or produce power for said grid or to be injected into said grid, said hydroelectric power plant comprising at least a first hydroelectric unit and a second hydroelectric unit, each provided with a runner mechanically coupled to a shaft line and to a generator, a distributor comprising guide vanes to control a flow of water to said runner, said hydroelectric power plant further comprising a variable frequency drive, at least comprises, in the following order:

a) starting the rotation of at least both first and second hydroelectric units;

b) connecting the generator of the first hydroelectric unit to the variable frequency drive and stabilizing the speed of the first hydroelectric unit;

c) connecting the generator of the first hydroelectric unit to the grid and disconnecting the generator of the first hydroelectric unit from the variable frequency drive;

d) connecting the generator of the second hydroelectric unit to the variable frequency drive and stabilizing the speed of the second hydroelectric unit;

e) connecting the generator of the second hydroelectric unit to the grid and disconnecting the second hydroelectric unit from the variable frequency drive.

Another specific embodiment of any of the above methods or of a method for coupling a hydroelectric power plant in a turbine mode to a grid, in order to generate or produce power for said grid or to be injected into said grid, said hydroelectric power plant comprising at least a first hydroelectric unit and a second hydroelectric unit, each provided with a runner mechanically coupled to a shaft line and to a generator, a distributor comprising guide vanes to control a flow of water to said runner, said hydroelectric power plant further comprising a variable frequency drive, at least comprises:

a) starting the rotation of at least both first and second hydroelectric units;

b) then connecting the generator of the first hydroelectric unit to the variable frequency drive and stabilizing the speed of the first hydroelectric unit;

c) then connecting the generator of the first hydroelectric unit to the grid and disconnecting the generator of the first hydroelectric unit from the variable frequency drive;

d) then connecting the generator of the second hydroelectric unit to the variable frequency drive and stabilizing the speed of the second hydroelectric unit;

e) then connecting the generator of the second hydroelectric unit to the grid and disconnecting the second hydroelectric unit from the variable frequency drive.

In any of the above embodiments of a method according to the invention, step a), or the step of starting the rotation of both hydroelectric units, can include partially opening the guide vanes of the distributor of the first hydroelectric unit and of the second hydroelectric unit.

The variable frequency drive is common to both, or to all, hydroelectric units.

The guide vanes of the distributor of the first hydroelectric unit, respectively the second hydroelectric unit, can be further opened after step c), or after the step of connecting the generator of the first hydroelectric unit to the grid, respectively after step e), or after the step of connecting the generator of the second hydroelectric unit to the grid.

In a particular embodiment, the guide vanes of the distributor of the first hydroelectric unit are more open than the guide vanes of the distributor of the second hydroelectric unit during part of the time span between the beginning of step a) (or of the start of rotation of both hydroelectric units) and the beginning of step c) (or of the connecting step of the generator of the first hydroelectric unit to the grid).

Preferably the second hydroelectric unit is connected to the variable frequency drive less than 20 s or 25 s after connecting the first hydroelectric unit to the grid.

The invention also concerns a hydroelectric power plant comprising at least a first hydroelectric unit and a second hydroelectric unit each provided with a runner mechanically coupled to a shaft line and to a generator and comprising a distributor comprising guide vanes to control a flow of water to said runner, said power plant further comprising a variable frequency drive and a controller to couple said hydroelectric power plant to the grid so as to implement a method according to the invention, for example as recited above.

In a method according to the invention:
   the opening of the guide vanes of the distributor of the first hydroelectric unit, respectively of the second hydroelectric unit or of any further hydroelectric unit, can be controlled through a first control loop;
   and/or the variable frequency drive can be controlled through a second control loop, in particular during steps b), and/or c), and/or d) and/or e) or during the step of connecting the generator of the first hydroelectric unit to the variable frequency drive and then to the grid, and/or during the step of connecting the generator of the second hydroelectric unit to the variable frequency drive and then to the grid.

The hydroelectric power plant can comprise at least a third hydroelectric unit, also provided with a runner mechanically coupled to a shaft line and to a generator, a distributor comprising guide vanes to control a flow of water to said runner of said third hydroelectric unit, the method further comprising:
   a') starting the rotation of said third hydroelectric unit with, or at the same time as, said first hydroelectric unit and said second hydroelectric unit;
   b') after step e) (or after connecting the generator of the second hydroelectric unit to the grid), connecting said variable frequency drive to the generator of the third hydroelectric unit and to the grid and stabilizing the speed of the third hydroelectric unit;
   c') then connecting the third hydroelectric unit to the grid and disconnecting the generator of the third hydroelectric unit from said variable frequency drive.

The guide vanes of the distributor of the third hydroelectric unit can be further opened after step c').

The variable frequency drive can be controlled during step b') through a second control loop which includes said variable frequency drive.

The invention also concerns a hydroelectric power plant comprising at least a first hydroelectric unit and a second hydroelectric unit, each provided with a runner mechanically coupled to a shaft line and to a generator and comprising a distributor comprising guide vanes to control a flow of water to said runner, said power plant further comprising a variable frequency drive and a controller.

Said controller can be configured, and said hydroelectric power plant can be used, to implement a method according to the invention.

In a hydroelectric power plant or in a method according to the invention, each hydroelectric unit comprises a turbine which can be of the Francis or Kaplan or bulb or Pelton or reversible Francis or pump turbine type.

According to a particular embodiment of a method or of a hydroelectric power plant according to the invention:
   the first hydroelectric unit, respectively the second hydroelectric unit, is/can be connected to the variable frequency drive through a first, respectively a second, connection means; and/or:
   the first hydroelectric unit, respectively the second hydroelectric unit, is/can be connected to the grid through a third, respectively a fourth, connection means; and/or:
   said variable frequency drive is/can be connected to the grid through a fifth connection means.

In a hydroelectric power plant according to the invention, each of the hydroelectric units can comprise:
   a first control loop to control the opening of the guide vanes;
   a second control loop, to control the variable frequency drive which is common to all hydroelectric units of said hydroelectric power plant.

An embodiment of a hydroelectric power plant according to the invention can comprise at least a third hydroelectric unit, also provided with a runner mechanically coupled to a shaft line and to a generator, a distributor comprising guide vanes to control a flow of water to said runner of said third hydroelectric unit, said variable frequency drive and said controller being configured to couple said hydroelectric power plant to a grid so as to implement a method according to the invention for coupling a hydroelectric power plant to the grid, comprising at least a third hydroelectric unit, in a turbine mode.

The invention also concerns a hydroelectric power plant comprising a plurality of hydroelectric units, each provided with a runner mechanically coupled to a shaft line and to a generator and comprising a distributor comprising guide vanes to control a flow of water to said runner, said power plant further comprising a variable frequency drive and a controller, each of the turbines further comprising,
   a first control loop to control the opening of the guide vanes;
   a second control loop, to control said variable frequency drive which is common to all hydroelectric units of said hydroelectric power plant.

Said controller can be configured, and said hydroelectric power plant can be used, to implement a method according to the invention.

Said hydroelectric power plant can further comprise the above features of power plant according to the invention.

The invention further concerns a computer program comprising instructions for implementing a method according to the invention, for example as recited above.

The invention allows a reduction of the time response defined as the time between receiving the order to provide a given level of power to the grid and the moment when this level of power is provided to the grid.

BRIEF DESCRIPTION OF THE DRAWINGS

Other characteristics and advantages shall appear in the following description of embodiments of the method for coupling a hydroelectric turbine to the grid according to the invention, given by way of non-limiting examples, in reference to the annexed drawings wherein.

DETAILED DESCRIPTION OF SPECIFIC EMBODIMENTS

Figure 1:
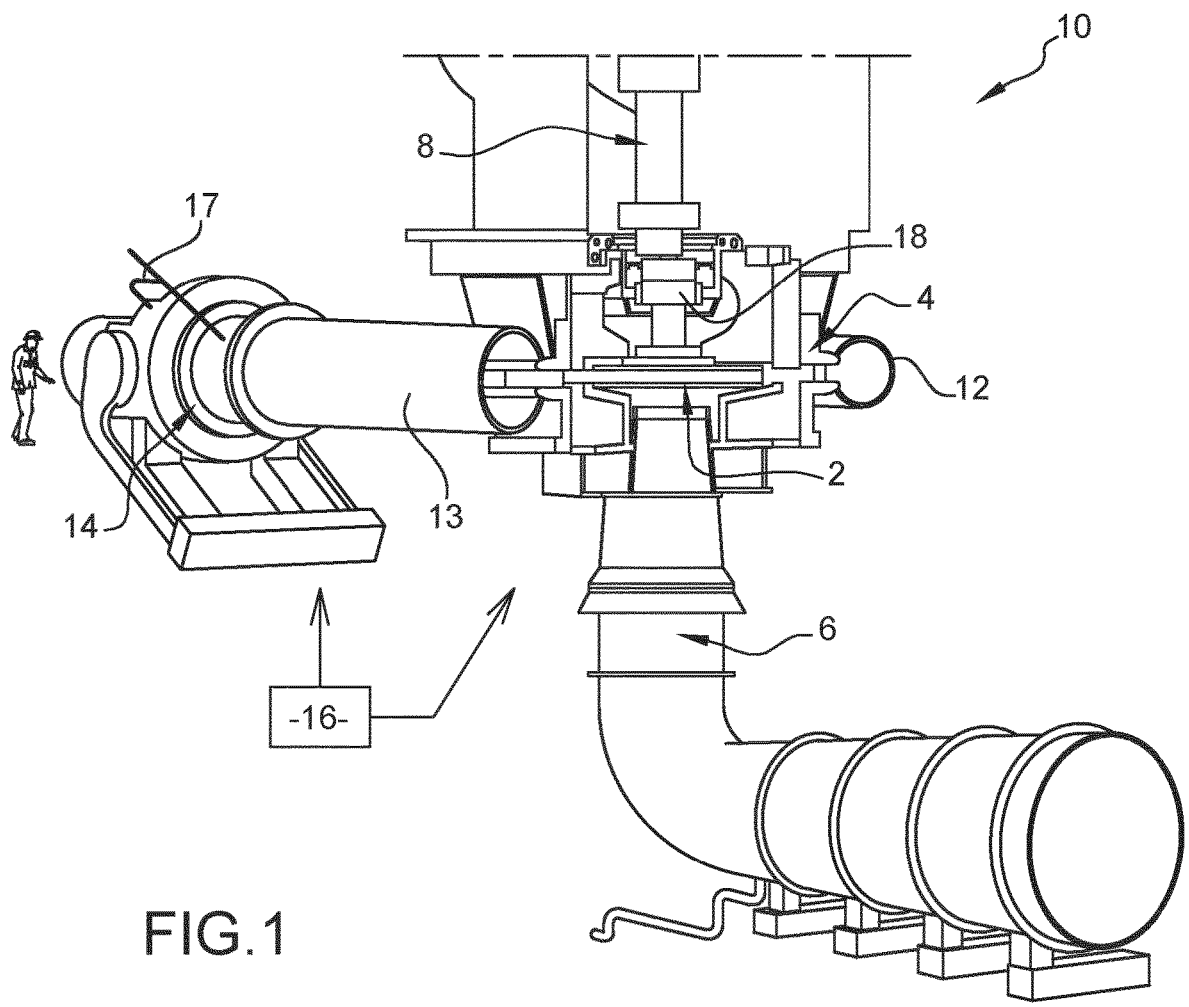
FIG. 1 is a schematic representation of a hydroelectric unit comprising one hydraulic turbine.

An example of a hydroelectric unit (pump-turbine) 10 which can be used in the frame of the present invention is illustrated in FIG. 1. Said hydroelectric unit can be implemented in a hydroelectric power plant with one reservoir upstream of the plant and one reservoir downstream of the plant. It can be used as a pump, to pump water from the downstream side of the plant to the upstream side. Alternatively, it is operated in a turbine mode, to produce electricity to the grid from the water head difference between the upstream and the downstream reservoirs.

Hydroelectric unit 10 comprises a runner 2, a distributor 4, a draft tube 6 and a shaft line 8. A spiral case 12 guides a flow of water from a duct 13 connected to a main inlet valve 14 to the distributor, downstream of a penstock.

Via the shaft line 8 the runner 2 is mechanically coupled to the rotor of a generator; when rotating, the runner drives the rotor into rotation inside the stator windings. The stator windings are themselves intended to be connected to a grid via a circuit breaker and a transformer.

The distributor 4 comprises guide vanes and is water-tight in closed position.

The main inlet valve 14 may be for example a spherical valve or a butterfly valve. Both need a certain time to be opened, for example 30 s, which can comprise 5 s to 10 s to equilibrate the pressure between the upstream side and the downstream side of the valve, for example by opening one or more bypass pipes 17. After this pressure balancing, the valve 14 can be opened.

As disclosed in EP 3361088, a variable frequency drive can be used to assist a start-up mode of pump-turbine 10 in the turbine mode.

Figure 2:
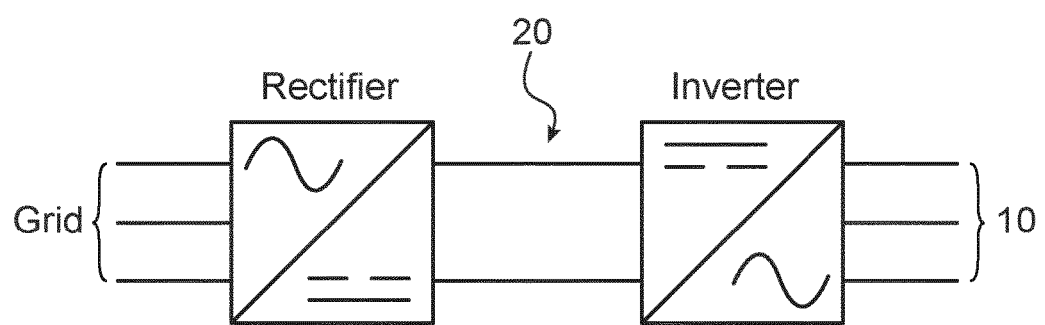
FIG. 2 is a schematic representation of a variable frequency drive, which can be used in connection with the present invention.

The electric torque can be provided through a variable frequency drive connected to the grid and to an alternator of the hydraulic machine 10; it comprises for example a static frequency converter, which can be a voltage source inverter or a current source inverter. An example of a variable frequency drive 20 is given on FIG. 2: it is here a static frequency converter, comprising a rectifier and an inverter; said static frequency converter comprises networks of thyristors to convert a current from a grid at a fixed frequency (50 Hz in this example) into a current at a variable frequency; it forms a controlled electrical torque provider, working at a variable frequency.

Figure 3:
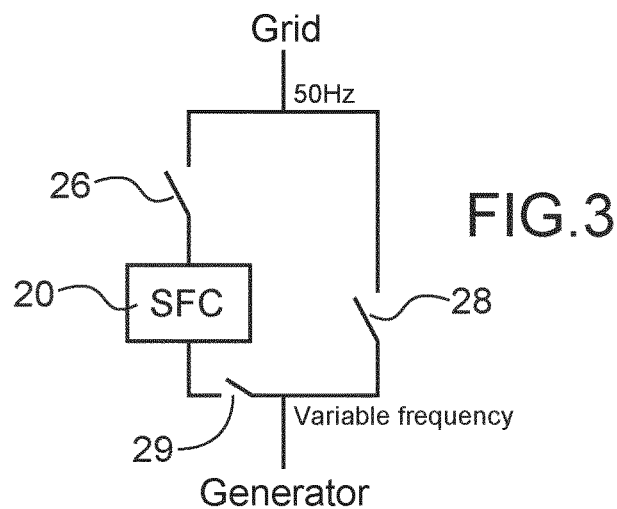
FIG. 3 is a schematic representation of the connections of a variable frequency drive between a hydroelectric unit and an electrical network (grid)

As can be understood from FIG. 3, the static frequency converter 20 can be connected to the generator of the turbine and can be connected to the grid at a fixed frequency (50 Hz in this example) through first connection means or switch 26. The generator of the turbine can also be connected to the grid through second connection means or switch 28 (or generator circuit breaker). A third switch 29 has the same function as switches 32 and 34 (FIG. 4) which are used to connect/disconnect each hydroelectric unit to the variable frequency drive 20.

In a hydroelectric power plant comprising 2 (or more) hydro-electric units 10, 100 (FIG. 4), a single common variable frequency drive 20 can be used for both (or for all) generators, each generator being for example connected to the variable frequency drive 20 through corresponding connection means or switches 32, 34 (so-called starting disconnector switches) and to the grid through two other connection means or switches 42, 44 (so-called generator circuit breakers) and two transformers 43, 45. Variable frequency drive 20 can itself be connected to the grid through connection means or switch 46. Each connection means or switch can comprise one or more IGBT(s) (Insulated Gate Bipolar Transistor). An example of a hydro-electric unit 10 was described in connection with FIG. 1; Hydroelectric unit 100 (and any further hydro-electric unit if the plant has more than 2 hydro-electric units) is identical to hydro-electric unit 10.

The rotation speed of hydroelectric unit 10, respectively 100, is controlled through a first control loop 21, respectively 121, controlling the guide vanes orientation of the corresponding machine based on the difference between a target speed N10_sp, respectively N100_sp, and a rotation speed N10, respectively N100, of said corresponding machine. Rotation speed can be measured with a speed sensor, for example using an inductive sensor placed opposite a toothed wheel; alternatively the speed measurement may be obtained through conversion from the frequency signal (the signal being taken from the secondary of a voltage transformer of the main generator). Said first control loop 21, respectively 121, comprises a guide vanes controller 22, respectively 122, and a guide vanes actuator 24, respectively 124, which provides a guide vane orientation γ10, respectively γ100, for the guide vanes of the hydro-electric unit 10, respectively 100. Said first control loop 21, respectively 121, provides a coarse regulation. If the plant has more than 2 hydroelectric units any further hydroelectric unit also has a first control loop similar to control loop 21 or 121.

A second control loop 23, 123 controls the electric torque of variable frequency drive 20 by a variable frequency drive controller 36 (which is common to both loops 23, 123). The input of this second control loop is the difference between the measured rotation speed N10, N100 and the target rotation speed N10_sp and N100_sp. Said second control loop 23, respectively 123, provides a fine regulation.

The control loops 21, 121, 23, 123 will not be represented on FIGS. 5A-6C but are included in the hydroelectric plant represented thereon.

An example of a method according to the invention, in particular for coupling a hydroelectric power plant to the grid as described above, is now described.

In this example this method is for coupling the hydroelectric power plant or each of the two hydroelectric units 10, 100 of the hydroelectric power plant to the grid, so that the power plant produces the maximum power in the shortest possible time.

Each hydroelectric unit 10, 100 is driven into rotation in a turbine mode, with water flowing from the upstream to the downstream reservoir. Preferably, both hydroelectric units 10, 100 are simultaneously driven into rotation. The guide vanes of each turbine are controlled by each of the first control loops 21, 121 and are partly opened and the speed of each turbine progressively increases.

The speed of the first hydroelectric unit 10 is stabilized with help of the variable frequency drive 20 (through second control loop 23), so that the first hydroelectric unit can be directly connected to the grid. In other words the speed of the first hydroelectric unit becomes equal to the speed required to produce power at frequency of the grid (for example 50 Hz).

Then the speed of the second hydroelectric unit 100 is stabilized with help of the variable frequency drive 20 (through second control loop 123), so that the second hydroelectric unit can be directly connected to the grid. In other words the speed of the second hydroelectric unit becomes equal to the speed required to produce power at frequency of the grid (for example 50 Hz).

The inventors have noted that connecting the first hydroelectric unit directly to the grid creates disturbances of the speed of the second hydroelectric unit 100 (which, as explained above, was driven into rotation simultaneously to the first hydroelectric unit). For this reason, the speed of the second hydroelectric unit is stabilized by the variable frequency drive as soon as possible after the first hydroelectric unit is connected to the grid.

The different steps of this example are now set out in more detail in connection with FIGS. 5A-5C and 6A-6C.

Both hydroelectric units 10, 100 are simultaneously driven into rotation, the guide vanes of each of them being controlled through the control loop 21, respectively 121.

Figure 5A:
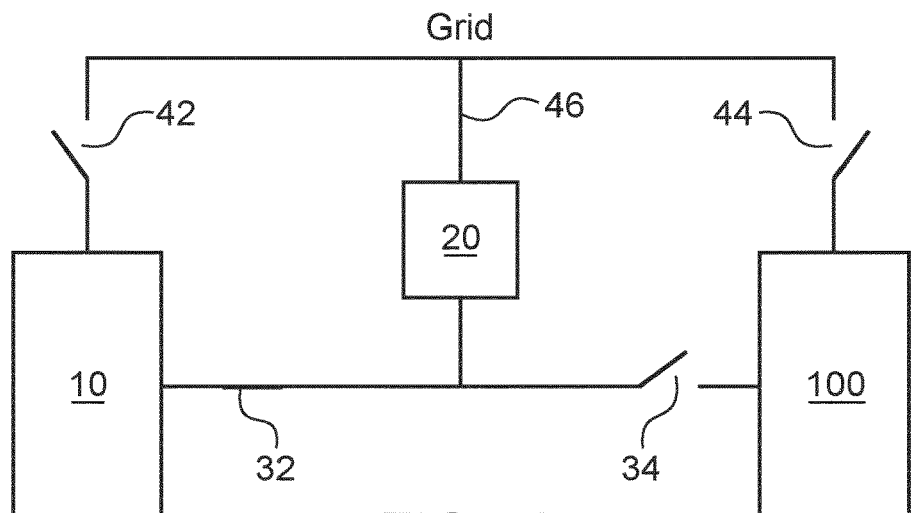
FIGS. 5A-5C and 6A-6C illustrate different steps of a method for coupling a hydroelectric power plant to the grid according to the invention.
Figure 5B:
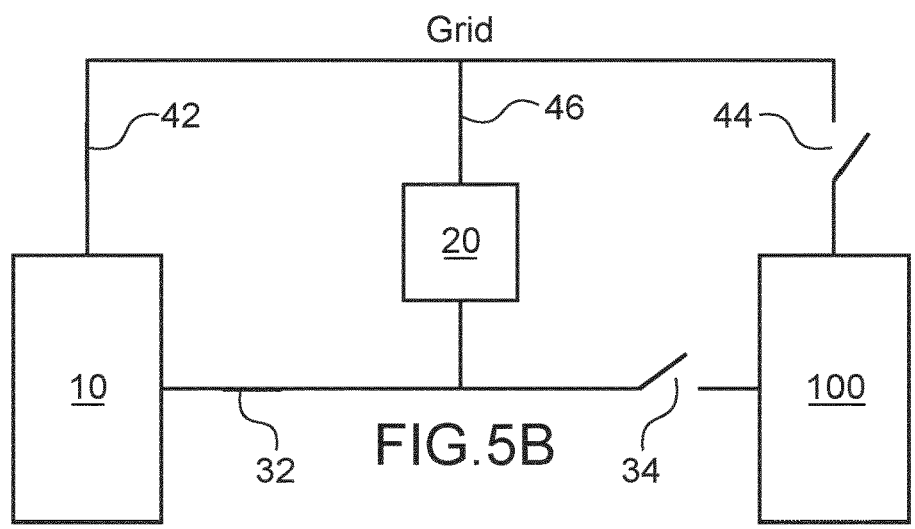
Figure 5C:
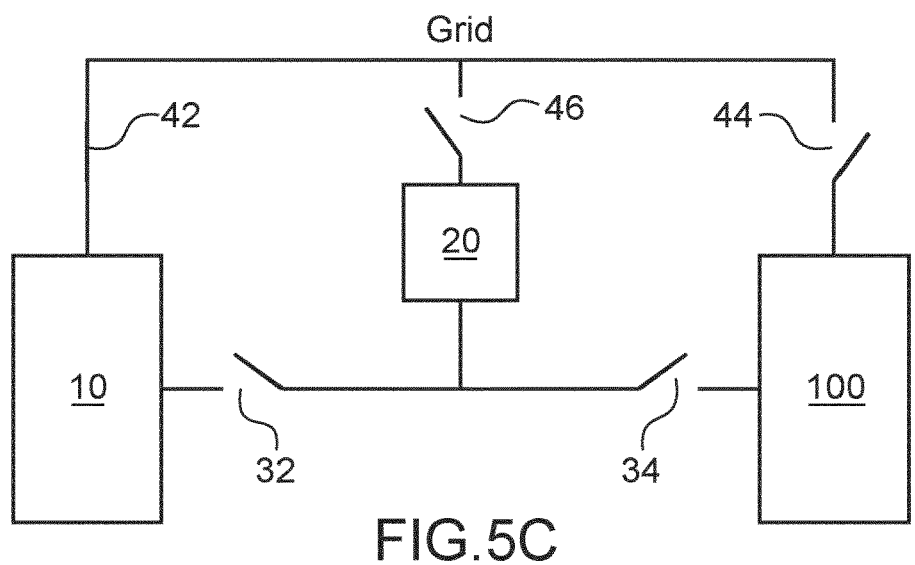

As illustrated on FIG. 5A, one of the connection means 32, 34, for example 32, is first switched on in a conducting state in order to connect the corresponding hydroelectric unit 10 to the variable frequency drive 20 which is itself connected to the grid through connection means 46. Variable frequency drive 20 can thus reduce the rotation speed of hydroelectric unit 10 (through loop 23) when its speed is exceeding the upper limit of a coupling range. When its speed has reached a prescribed speed target, corresponding to the grid frequency, connection means 42 can be switched on in a conducting state, thus connecting hydroelectric unit 10 to the grid (FIG. 5B). Connection means 32 and 46 can then be switched off (FIG. 5C). It has to be noted that after connection means 42 are switched on, the guide vanes of the first hydroelectric unit 10 (like those of the second hydroelectric unit 100) are only partly open and are then progressively opened until the power produced by hydroelectric unit 10 is at the desired level (or setpoint), for example at maximum power.

Figure 6A:
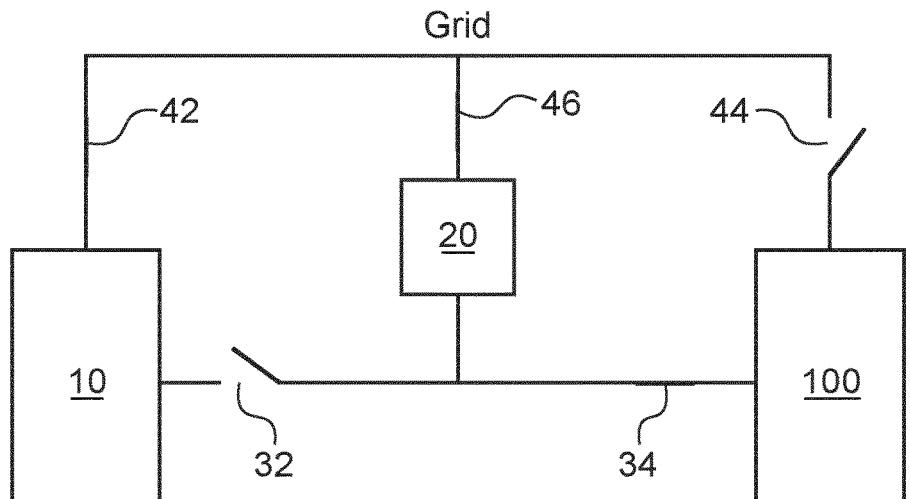
Figure 6B:
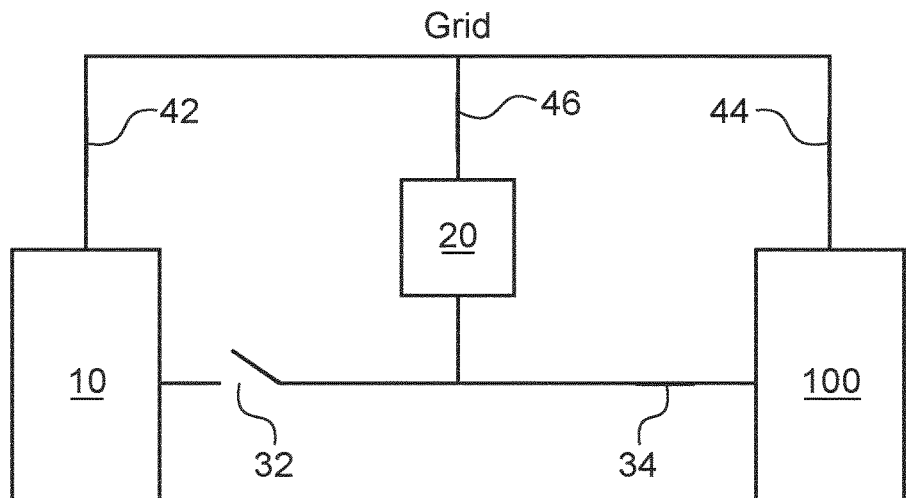
Figure 6C:
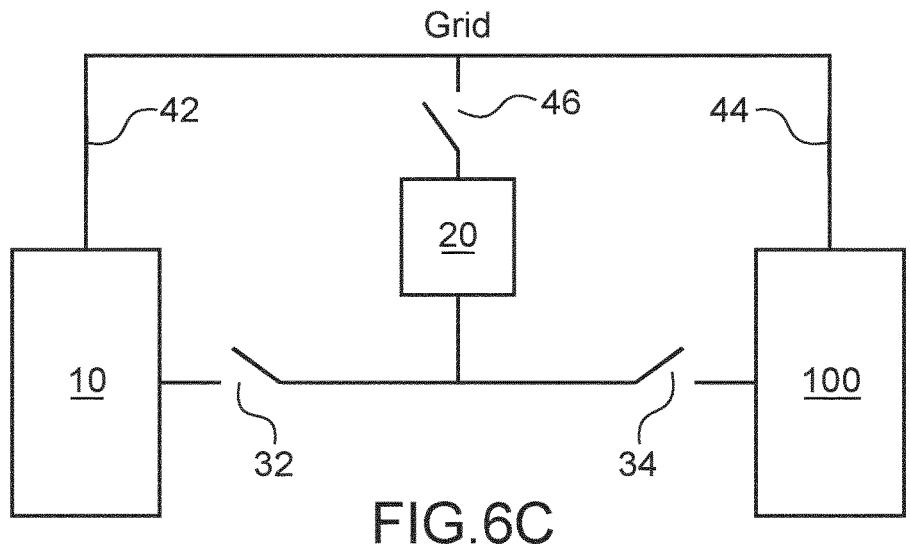

The connection means 34 can then be switched on in order to connect the corresponding hydroelectric unit 100 to the variable frequency drive 20 which is itself connected to the grid through connection means 46 (FIG. 6A). It has to be noted that switching off connection means 32 and switching on connection means 34 can take some time, for example between 10 s and 20 s, for example 16 s. Variable frequency drive 20 reduces the rotation speed of hydroelectric unit 100 (through loop 123) when its speed is exceeding the upper limit of a coupling range. When said speed has reached a prescribed speed target, corresponding to the grid frequency, connection means 44 can be switched on in a conducting state, thus connecting hydroelectric unit 100 to the grid (FIG. 6B). Connection means 34 and 46 can then be switched off (FIG. 6C). It has to be noted that after connection means 44 are switched on, the guide vanes of the second hydroelectric unit 100 are only partly open and are progressively opened until the power produced by generator 100 is maximum.

As already explained above, switching on connection means 42 (FIG. 5B) for connecting the first hydroelectric unit 10 to the grid creates disturbances of the speed of the second hydroelectric unit 100. For this reason, connection means 32 are switched off and connection means 34 are switched on as soon as possible after connection means 42 are switched on to couple hydroelectric unit 10 to the grid. Due to switching times, the second hydroelectric unit 100 is coupled to the Variable frequency drive 20 after only 10 s to 20 s.

Figure 7A:
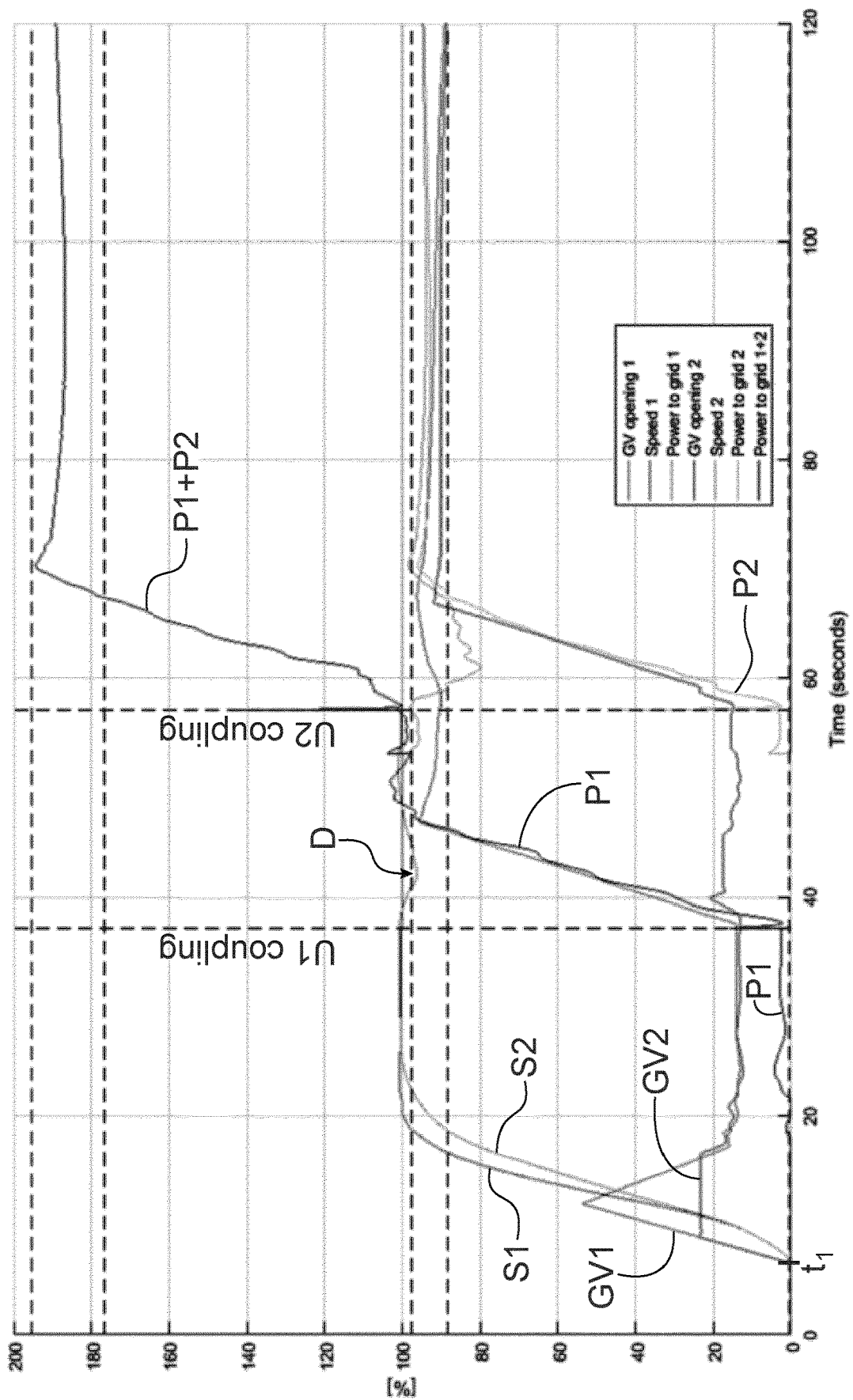
FIGS. 7A and 7B are timing diagrams of startup sequences of a hydroelectric power plant according to the invention (FIG. 7A) and according to the prior art (FIG. 7B).

FIG. 7A is a diagram showing several parameters of the first hydroelectric unit 10 and of the second hydroelectric unit 100 when implementing a method according to the invention:

S1, respectively S2, represents the speed of the first, respectively second, hydroelectric unit;

GV1, respectively GV2, is the opening of the guide vanes of the 1st, first, respectively second, hydroelectric unit;

P1, respectively P2, is the power produced by the first, respectively second, hydroelectric unit.

Both hydroelectric units are driven into rotation at the same time t1, after receipt of the start order, the guide vanes of both being rapidly partially opened as illustrated by curves GV1 and GV2. The speed of both hydroelectric units thus increases from t1. Coupling the first hydroelectric unit to the variable frequency drive, for example some seconds (in the example of FIG. 7A: at about 20 s) after receipt of the start order allows an early stabilization of the speed and an early coupling of the first hydroelectric unit to the grid («U1 coupling» at about 37 s on FIG. 7A).

As can be understood from this diagram, according to a particular embodiment, GV1 can be more open than GV2 shortly after t1, between t1 (starting of both turbines) and the connection of the first hydroelectric unit to the grid ("U1 coupling"), or shortly after starting the rotation of both hydroelectric units. This dynamic opening of the guide vanes of the first hydroelectric unit can disturb its speed, the variable frequency drive 20 absorbing the hydraulic fluctuations during its coupling. Alternatively it is possible to have a same opening of both GV1 and GV2.

The first hydroelectric unit produces power P1 which is injected to the grid through the variable frequency drive 20. Alternatively said first hydroelectric unit absorbs power from the grid. In both cases, the power produced by the first hydroelectric unit increases, together with the further opening of the guide vanes GV1, after coupling of the hydroelectric unit turbine to the grid («U1 coupling»).

As can be seen on FIG. 7A, the load ramp up of the first generator to the grid creates a pressure dip for both machines, and in particular disturbances of the speed S2 of the second hydroelectric unit: curve S2 shows a dip D shortly after the «U1 coupling». S2 is however stabilized after coupling of the second hydroelectric unit to the variable frequency drive 20 (in the example of FIG. 7A: at about 53 s), which then allows a coupling of said second hydroelectric unit to the grid («U2 coupling»). The second hydroelectric unit produces power P2 injected to the grid through the variable frequency drive. Alternatively said second hydroelectric unit absorbs power from the grid. In both cases, the power produced by the second hydroelectric unit increases, together with the further opening of the guide vanes GV2, after coupling of the second hydroelectric unit to the grid.

The total power produced by both hydroelectric units together amounts to P1+P2. A full power, with P1+P2 close to its maximum, is produced at about 60 s after t1.

Figure 7B:
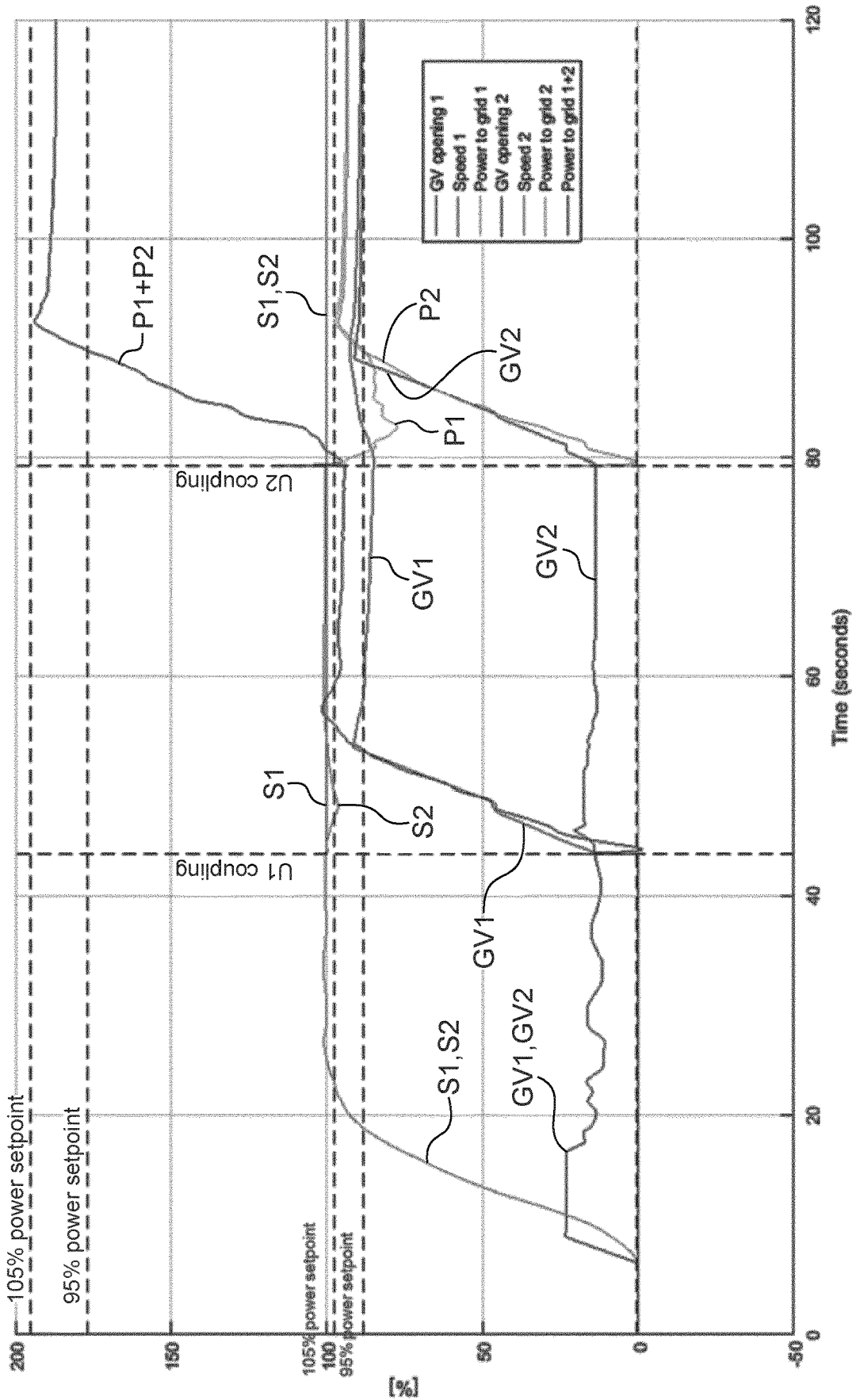

FIG. 7B is a diagram showing the same parameters S1, S2, GV1, GV2, P1 and P2 of the first hydroelectric unit 10 and of the second hydroelectric unit 100 when implementing a start-up method according to the prior art, without variable frequency drive.

The initial opening of the guide vanes GV1 of the first hydroelectric unit turbine 10 is less than on FIG. 7A because of the lack of variable frequency drive.

The coupling of the first hydroelectric unit 10 («U1 coupling») also occurs later than on FIG. 7A.

Like on FIG. 7A, the coupling of the first hydroelectric unit to the grid creates disturbances of the speed S2 of the second hydroelectric unit. However, due to the lack of variable frequency drive, S2 stabilizes later than on FIG. 7A and the coupling of the second hydroelectric unit to the grid («U2 coupling») also occurs later (at about 80 s).

In the above examples the plant system comprising two hydroelectric units. However, the invention also applies to a plant comprising for example 3 or 4 hydroelectric units connected to a common variable frequency drive. A third (respectively a fourth) hydroelectric unit can be started at the same time as the first and second hydroelectric units (and possibly a third), but it will be connected to the variable frequency drive after the second (respectively the third) hydroelectric unit is connected to the grid («U2 coupling» on FIG. 5A) and while the guide vanes of the third hydroelectric unit (respectively the fourth) are in the process of being further opened. In other words the same sequence of steps described above for the second generator with respect to the first hydroelectric unit can apply to the third (respectively the fourth) hydroelectric unit with respect to the second hydroelectric unit (respectively this third), etc.

Figure 4:
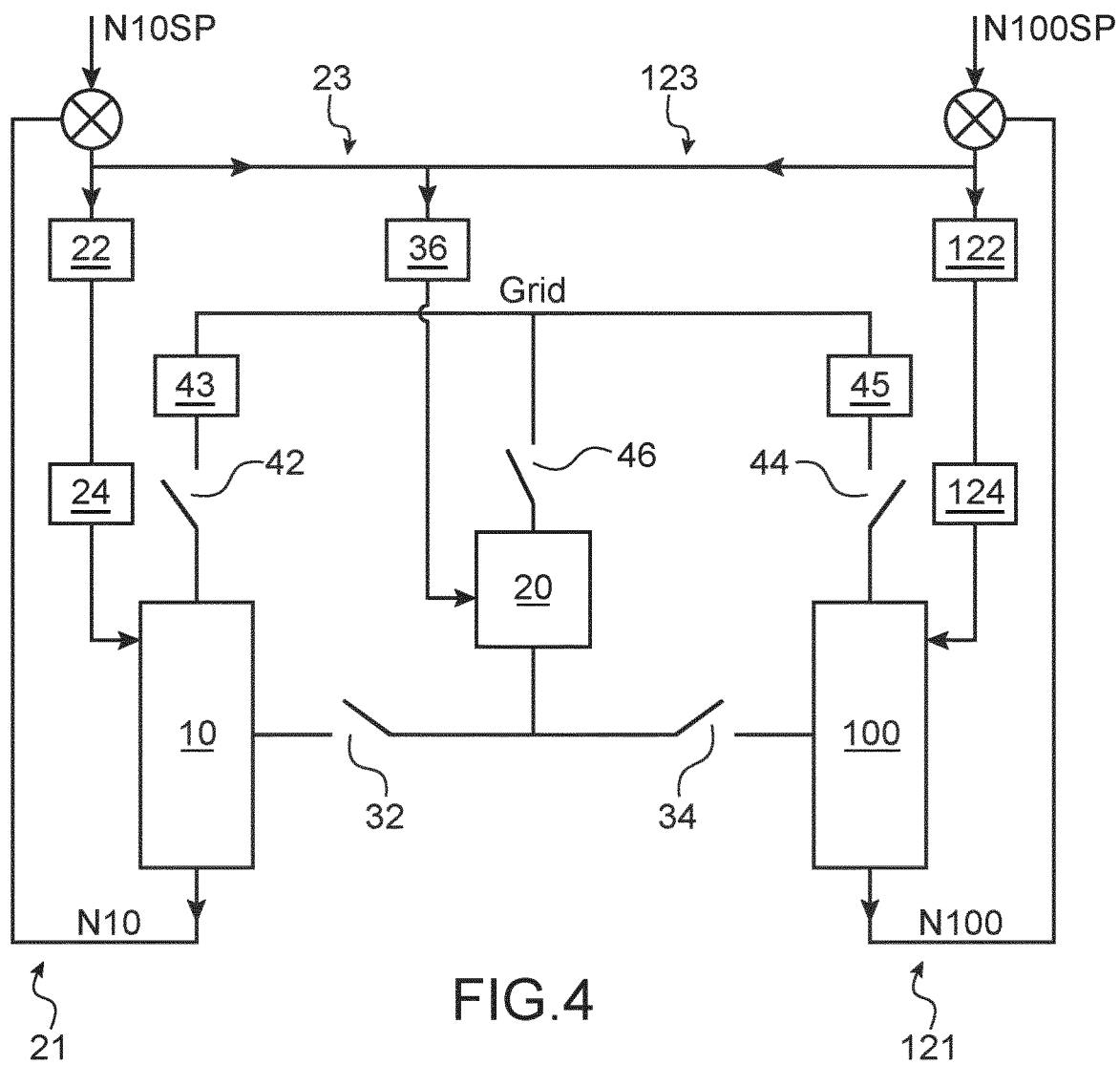
FIG. 4 is a schematic representation of a hydroelectric power plant comprising 2 hydraulic hydroelectric units and the associated variable frequency drive and switches.

The system of FIG. 4, and in particular the switching on/off of the connection means, the variable frequency drive 20, the opening and the closing of the main inlet valve (FIG. 1, ref 14) and of the guide vanes of both hydroelectric units, is controlled by one or more processor(s) or computer(s) 16, or by a computer system, configured or programed so as to implement a method according to the invention, in particular in order:
- to initially start both hydroelectric units 10, 100 and increase their speed;
- to connect the variable frequency drive 20 to the first hydroelectric unit 10 in order to stabilize the speed of the first hydroelectric unit 10;
- to connect the first hydroelectric unit to the grid;
- to connect the variable frequency drive 20 to the second hydroelectric unit 100 in order to stabilize the speed of the second hydroelectric unit 100;
- to connect the second hydroelectric unit to the grid.

For example said processor(s) or computer(s) 16 or said computer system implements a computer program comprising instructions for implementing a method according to the invention.

In a particular embodiment a computer system implementing a method according to the invention comprises a central control system which supervises one or more controllers, each of said controllers controlling part of the hydroelectric power plant comprising two or more hydroelectric units.

The present invention proposes a method for coupling a hydroelectric plant to the grid, said plant comprising 2 or more hydroelectric units, in a faster way than known prior art methods. It reduces the time to connect said hydroelectric plant to the grid.

The invention claimed is:

1. A method for coupling a hydroelectric power plant in a turbine mode to a grid in order to generate power for the grid, wherein the hydroelectric power plant includes:
   a first hydroelectric unit and a second hydroelectric unit;
   each of the first and second hydroelectric units having a runner mechanically coupled to a shaft line and to a generator, and a distributor comprising guide vanes to control a flow of water to the runner; and
   a variable frequency drive;
the method comprising:
   a) starting rotation of the first hydroelectric unit and the second hydroelectric unit;
   b) after the first and the second hydraulic units are rotating, connecting the variable frequency drive to the generator of the first hydroelectric unit and to the grid, and stabilizing a speed of the first hydroelectric unit;
   c) connecting the first hydroelectric unit to the grid and then disconnecting the generator of the first hydroelectric unit from the variable frequency drive;
   d) connecting the variable frequency drive to the generator of the second hydroelectric unit and to the grid and stabilizing a speed of the second hydroelectric unit; and
   e) connecting the second hydroelectric unit to the grid and then disconnecting the generator of the second hydroelectric unit from said variable frequency drive;
   wherein steps (a) through (e) are performed in recited order.

2. The method according to claim 1, wherein step a) includes partially opening the guide vanes of the first hydroelectric unit and of the second hydroelectric unit.

3. The method according to claim 2, wherein the guide vanes of the first hydroelectric unit are further opened after step c).

4. The method according to claim 2, wherein the guide vanes of the second hydroelectric unit are further opened after step e).

5. The method according to claim 1, wherein the guide vanes of the first hydroelectric unit are more open than the guide vanes of the second hydroelectric unit during part of a time span between the beginning of step a), and the beginning of step c).

6. The method according to claim 1, wherein the generator of the second hydroelectric unit is connected to the variable frequency drive less than 20 seconds after connecting the first hydroelectric unit to the grid.

7. The method according to claim 1, wherein:
   the generator of the first hydroelectric unit and the generator of the second hydroelectric unit are connectable to the variable frequency drive through a first and a second connection, respectively;
   the generator of the first hydroelectric unit and the generator of the second hydroelectric unit are connectable to the grid through a third and a fourth connection, respectively; and
   the variable frequency drive is connectable to the grid through a fifth connection.

8. The method according to claim 1, wherein:
   an opening of the guide vanes of each of the first hydroelectric unit and the second hydroelectric unit is controlled through a first control loop; and the variable frequency drive is controlled during each of steps b) and e) through a second control loop.

9. The method according to claim 1, wherein the hydroelectric power plant includes a third hydroelectric unit having a runner mechanically coupled to a shaft line and to a generator and a distributor having guide vanes to control a flow of water to the runner of the third hydroelectric unit, the method further comprising:
   a') starting rotation of the third hydroelectric unit with the first hydroelectric unit and the second hydroelectric unit;
   b') after step e), connecting the variable frequency drive to the generator of the third hydroelectric unit and to the grid and stabilizing a speed of the third hydroelectric unit; and
   c') connecting the third hydroelectric unit to the grid and then disconnecting the generator of the third hydroelectric unit from the variable frequency drive.

10. The method according to claim 9, wherein the guide vanes of the third hydroelectric unit are further opened after step c').

11. A hydroelectric power plant, comprising;
   a first hydroelectric unit and a second hydroelectric unit, each of the first and second hydraulic units comprising a runner mechanically coupled to a shaft line and to a generator, and a distributor comprising guide vanes to control a flow of water to the runner;
   a variable frequency drive common to the first and second hydraulic units; and
   a controller configured to start the hydroelectric power plant according to the method of claim 1.

12. The hydroelectric power plant according to claim 11, wherein each of the first and second said hydroelectric units comprises a turbine configured as one of: a Francis, a Kaplan, a bulb, a Pelton, or reversible Francis or pump turbine type.

13. The hydroelectric power plant according to claim 11, wherein each of the first and second hydroelectric units comprises:
   a first control loop to control the opening of the guide vanes; and
   a second control loop to control the variable frequency drive.

14. The hydroelectric power plant according to claim 11, further comprising a third one of the hydroelectric units, the variable frequency drive common to the first, second, and third hydroelectric drives, the controller further configured to couple the hydroelectric power plant to the grid by:
   starting rotation of the third hydroelectric unit with the first hydroelectric unit and the second hydroelectric unit;
   after the second hydroelectric unit is connected to the grid and the generator of the second hydroelectric unit is disconnected from said variable frequency drive, connect the variable frequency drive to the generator of the third hydroelectric unit and to the grid and stabilizing a speed of the third hydroelectric unit; and
   connect the third hydroelectric unit to the grid and disconnect the generator of the third hydroelectric unit from the variable frequency drive.

* * * * *